United States Patent [19]

King et al.

[11] 4,361,759
[45] Nov. 30, 1982

[54] SPEED CONTROL SYSTEM FOR BOTTLING LINE

[75] Inventors: George W. King, Stouffville; Peter Fenwick, Toronto, both of Canada

[73] Assignee: Canadian Stackpole Limited, Scarborough, Canada

[21] Appl. No.: 225,303

[22] Filed: Jan. 15, 1981

[51] Int. Cl.³ .......................................... B65G 47/44
[52] U.S. Cl. ................................. 250/223 R; 198/347
[58] Field of Search ..................... 250/223 R; 198/347

[56] References Cited
U.S. PATENT DOCUMENTS
3,040,870 6/1962 Carter ................................. 198/347

Primary Examiner—David C. Nelms
Assistant Examiner—Darwin R. Hostetter

[57] ABSTRACT

A speed control system for a container processing line is disclosed. The container processing line has a container capper and a labeller for applying labels to capped containers, the speed control system providing improved line performance, smooth bottle handling and continuity in operation of the units. The speed control system synchronizes the labeller speed with the capper speed when a predetermined backlog of containers has accumulated upstream of the labeller.

18 Claims, 5 Drawing Figures

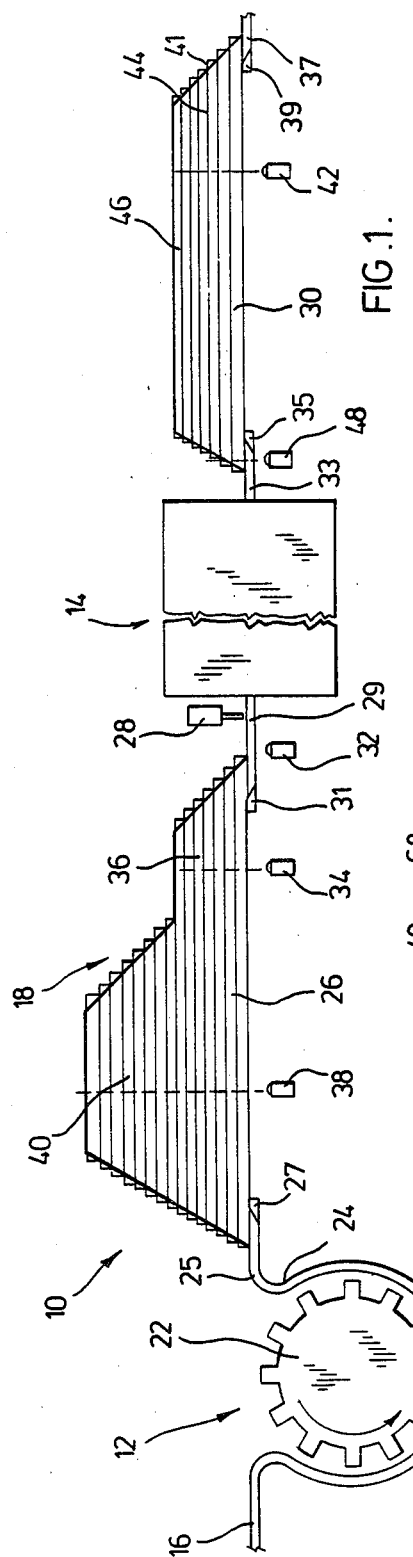
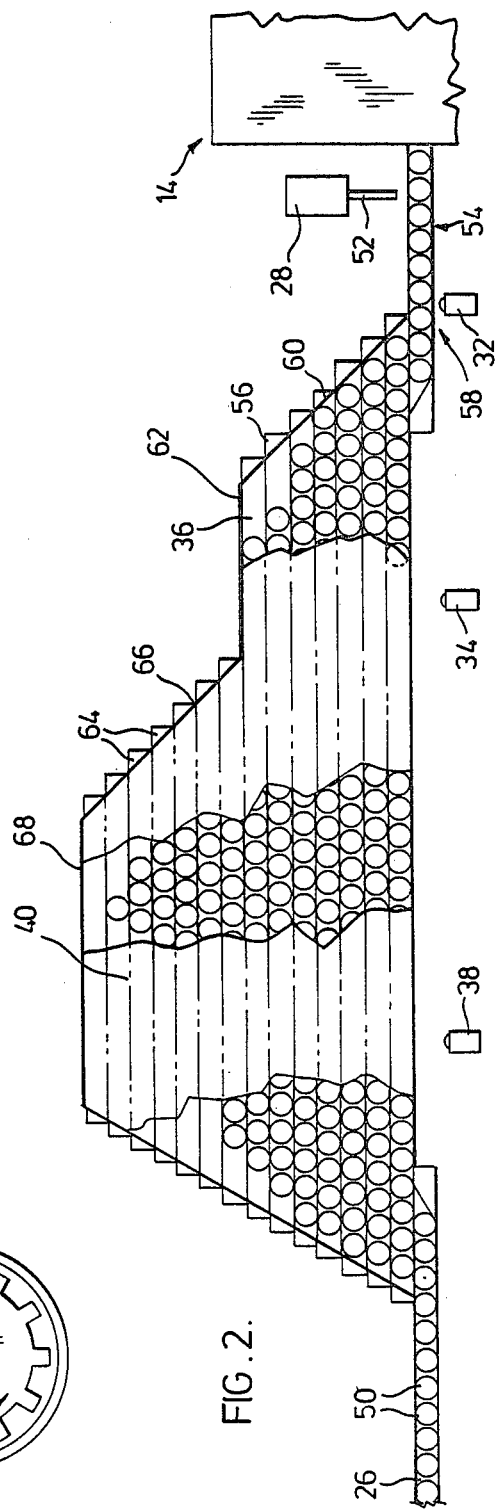
FIG. 1.
FIG. 2.

SPEED CONTROL SYSTEM FOR BOTTLING LINE

FIELD OF THE INVENTION

This invention relates to a container processing line and more particularly to a speed control system for such line which includes among other things a station for capping filled containers and a station for labelling capped containers.

BACKGROUND OF THE INVENTION

Container processing lines are commonly found in various fields of manufacture which involve containerizing liquid goods for sale. A very common form of container processing line is that of the distillery industry, where glass containers, such as bottles are filled with liquor, capped at a capping station, conveyed to a labelling station where appropriate labels are applied to each bottle and then conveyed to a packing station where the labelled bottles are placed in a carton for shipping. A concern in operating such a line is that the capping station, labelling station and packaging station may all be operating at different speeds. This can result in backlogs of containers upstream of the various stations thus necessitating some form of arrangement for accumulating containers as one machine attempts to catch up with the other machine.

Thus, significant advances have been made in the field of accumulation tables which may be made up of a plurality of conveyors spaced alongside one another having gathering rails which cause an accumulation of containers to expand laterally onto new conveyors, as they wait to be processed by the next station. However, with such accumulation tables and particularly with glass containers, there is a considerable amount of shock to the bottles as they slam into one another on the accumulation tables. Attempts have, therefore, been made to control the formation of a backlog of containers upstream of each station.

U.S. Pat. Nos. 3,607,547 and 3,738,891 are directed to this problem. In U.S. Pat. No. 3,607,547, it suggests the use of a single sensor upstream of a labeller and a single sensor downstream of the labeller in the container processing line to alter the speed of the labeller in an essentially "on/off" approach. In sensing a predetermined backlog of containers upstream of the labeller, the labeller is accelerated to a faster labelling speed to attempt to clear the backlog and once removed, resumes a slower speed. Similarly when a backlog of containers is sensed downstream of the labeller, the machine is slowed down.

It was realized, as explained in U.S. Pat. No. 3,738,891 that the use of a single sensor upstream and another downstream of the labeller caused frequent speed changes. Thus, the approach in this latter United States patent is to provide a plurality of sensors upstream of the labeller which function to vary the speed of the labeller in an "on/off" approach in response to the various sensors indicating certain backlogs of containers to thus run the machine at different speeds depending upon the backlog in attempting to control the backlog of containers upstream of the machine and maintain some degree of consistent flow of containers therethrough. However with this approach and the provision of several sensors, large accumulation tables are required upstream of the machine and since the system operates on the basis of "on/off," there is no control over maintaining a desired backlog of containers upstream of the machine which would enable a continued operation of the capping machine or the packing machine, should the labeller stop or should one of the other machines stop.

The control system, according to this invention, overcomes a number of the above problems by providing an efficient control on the labeller speed dependent upon the condition of backlog of containers upstream and downstream of the labeller while maintaining a desired backlog upstream of the labeller to provide a more overall efficient container processing line with regard to keeping the various units running while the speeds of the various units may fluctuate.

SUMMARY OF THE INVENTION

A speed control system, according to this invention, for a container processing line of the type described above comprises means for synchronizing the speed of the labelling station with the speed of the capping station when a predetermined accumulation of containers has gathered upstream of the labeller. This synchronization of the speed of the labeller with the capper thereby maintains the predetermined backlog of containers regardless of speed fluctuations in the capper.

The speed control system includes means positioned upstream of the labelling station for sensing the predetermined accumulated backlog of containers. In addition, means is provided for detecting the container capping speed of the capping station. A means controls the labelling speed of the labelling station and is adapted to operate the labelling station at a speed less than the container capping speed of the capping station to accumulate containers upstream of the labelling station. The speed control means synchronizes the container labelling speed of the labelling station with detected container capping speed in response to the sensing means sensing the predetermined accumulated backlog of containers on the conveyor system upstream of the labeller.

BRIEF DESCRIPTION OF THE DRAWINGS

Preferred embodiments of the invention are shown in the drawings wherein;

FIG. 1 is an overall plan view of a container processing line for processing containers which are filled, capped and labelled;

FIG. 2 is an enlarged view of the accumulating table upstream of the labeller;

DETAILED DESCRIPTION OF THE PREFERRED EMBODIMENTS

Figure 3:
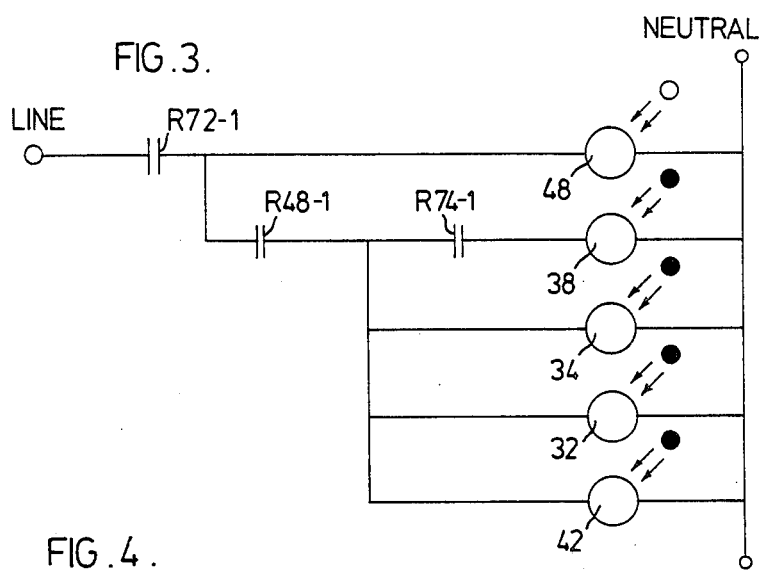
FIG. 3 is a circuit diagram showing the logic for the photoelectric sensors used in sensing accumulation of bottles upstream and downstream of the labeller.

FIG. 1 shows the container processing line generally designated 10 as comprising a capping and filling station 12, a labelling station 14, with conveyor 16 for infeed to the capper and filler, conveyor with accumulation provisions 18 for conveying capped, filled containers from capper 12 to labeller 14 and accumulation tables with conveyor 20 for transferring capped, labelled containers from the labeller 14 to a packing unit (not shown) downstream of the conveyor system 20.

Containers are conveyed along conveyor 16, where at the entrance to capper 12, an indexing mechanism is usually provided to evenly space the containers so that the filling turret generally designated 22 aligns with the container tops to commence filling and subsequently cap the containers as they leave at the exit point 24 of the machine. The containers, as they empty from capper 22, move along exit conveyor portion 25 which merges with the accumulation conveyor surfaces 18. A deflector rail 27 deflects the containers from conveyor 25 onto conveyor surface 26. The containers may continue to travel along the conveyor 26 to the labeller 14 where conveyor 29 is provided, which leads into labeller 14. Thus, the conveyor 26 merges into conveyor 29 with assistance from deflector rail 31. A container stop 28 is provided upstream of the indexing device for the labeller 14. The container stop 28 will be withdrawn when there is a sufficient accumulation of containers upstream of the labeller to commence operation. As the containers emerge from the labeller 14, they are conveyed away on conveyor 33 which merges with conveyor 30 of accumulation area 20 via deflection rail 35. The containers may continue to travel along conveyor 30 towards the packer unit where the conveyor infeed for the packer unit is 37 which merges with conveyor 30 with assistance from deflector rail 39 and rail 41 of the accumulation table 20.

Spaced along the conveyor systems 18 and 20 are sensors which sense various amounts of backlogs of containers upstream and downstream of the labeller. The sensors work in conjunction with a speed controller to be described in more detail. Sensor 32 determines the minimum accumulation of containers upstream of the labeller 14 to commence operation thereof. Sensor 34 is positioned to determine a second amount of container accumulation in area 36 which may be sufficient to cause the speed control to synchronize the labeller speed 14 with the capper speed 12. Sensor 38 is located further upstream along the accumulation table to indicate a substantial increase in accumulation of containers in area 40 to cause the labeller to operate at a speed faster than the capper 12 to clear the excessive backlog. Downstream of the labeller 14 sensor 42 senses a minimum accumulation of containers downstream of the labeller to signal the labeller 14 to slow down until that backlog is cleared by the packing unit. In the event that the packer slows down or stops and containers continue to accumulate in area 44 and further into area 46, sensor 48 senses the maximum accumulation of containers upstream of the labeller. In so doing, it causes the stop 28 to extend across the conveyor and cause the labeller 14 to reduce to a minimum "tick over" speed to clear bottles from the labeller.

Although not shown in FIG. 1, the packing unit may be a device which takes containers from the conveyor 30, arranges them into a grouping of, for example, twelve containers, lifts them off the conveyor and places them into a carton having dividers forming twelve compartments to receive the twelve containers. The packaging unit then passes the carton to another station where sealing tape is applied to complete the packaging of the containers for shipping.

Turning to FIG. 2, the mechanisms for accumulating containers upstream of the labeller 14 are shown. The conveyor 26 conveys evenly spaced-apart containers 50 toward the accumulation areas 40 and 36. With the container stop 28 positioning gate 52 across conveyor 26, containers begin to accumulate upstream of the labeller 14 and thereby bunch up in area 54 of the conveyor 26. As they continue to bunch up, the minimum accumulation of containers would be sensed by sensor 32. This minimum accumulation of containers upstream of the labeller 14 may be any desired number, where from experience it is realized that in commencing operation of the labeller 14 with the predetermined backup and labelling at a slow speed, the system will continue to operate assuming that the capper 12 also continues to operate. Thus, conveyor area 54 may be arranged to hold, for example, ten to thirty bottles.

Upon sensor 32 sensing that backlog, it works in conjunction with the speed control system to actuate gate 28, withdraw arm 52 and commence operating of the labeller 14 at its slow speed. The slow speed of the labeller 14 would be less than the capper speed. As bottles continue to move along conveyor 26, because they are not being removed from the area 54 at the rate they are coming towards it, bottles accumulate in the region of area 36. Area 36 includes a plurality of conveyor surfaces 56 which move in the same direction as its main conveyor 26. In accordance with the well known accumulation table techniques, the individual conveyor surfaces of group 56 move at progressively slower speeds for surfaces progressively spaced further from its main conveyor 26. As containers encounter a backlog in region 58, they commence backing up and the accumulation expands as containers slip to the side of conveyor 26 and build up on conveyor surfaces 56. As the accumulation expands, the bottles bunch up against angular rail 60 as they progressively backup along the various conveyor tracks 56 out to the lateral rail 62. Once the containers reach the lateral rail, they backup progressively towards the next sensor 34.

The accumulation table 36, according to this embodiment, is designed to hold a predetermined backlog of containers which is known to provide a sufficient supply to keep the labeller operating along with the packing unit for a predetermined time period, should the capper stop. This backlog may be in the region of 500 bottles, assuming a normal line speed of 200 bottles a minute. Sensor 34 in sensing when that backlog has been achieved, signals a speed controller to cause it to synchronize the speed of the labeller 14 with the speed of the capper 12 presuming that the capper continues to run. The desired backlog of containers in area 36 is, therefore, maintained independently of any speed fluctuations in the capper 12, because the labeller is synchronized therewith.

In the event, however, of the labeller having to slow down or stop due to a packer or a labeller stoppage, gate 28 is actuated to extend the arm 52 across the conveyor and continue to back up containers. In this situation assuming a backlog has been achieved in area 36, the containers now continue to bunch up in area 40. A substantially increased area of accumulation is provided with additional conveyors 64, where containers back up along slanted rail 66 and bunch up against the lateral rail 68 thus commencing to fill up area 40. Area 40 may be of sufficient size to accumulate twice the number of area 36 and may hold, for example, an additional 1,000 bottles. Should the containers backup in this area to the extent that sensor 38 senses that accumulation and assuming that the labeller 14 is now ready to commence operation, sensor 38 in conjunction with the speed controller will cause the labeller to run at a speed which is greater than that of the capper to begin removing the backlog of containers from area 40 and eventually reduce it down to area 36 at which time sensor 34 will eventually cause the controller to synchronize the labeller speed with the capper 12.

Figure 4:
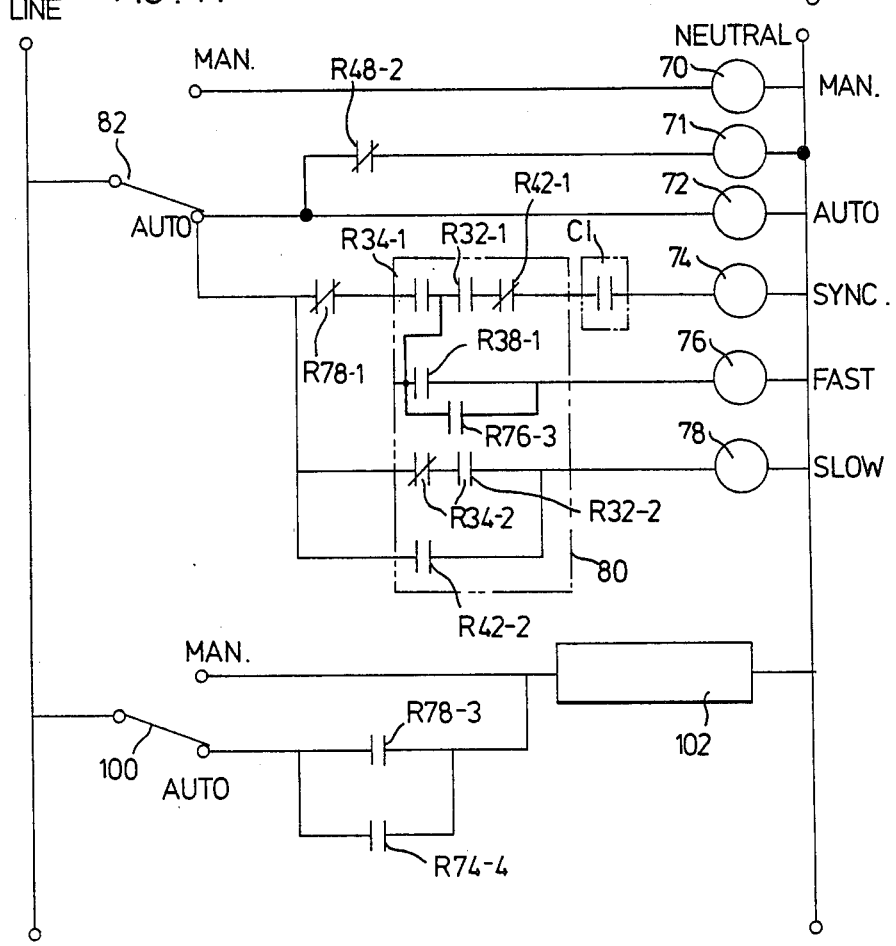
FIG. 4 is another circuit diagram showing the logic for controlling the various speeds of the labelling system.

According to a preferred embodiment, the logic for the photoelectric sensors and their corresponding actuation of electro-mechanical relays in operating input to the speed controller are shown in FIGS. 3 and 4. The sensors are arranged to have a beam emitter and receiver, where the beam crosses the path of the conveyor accumulation area. Once the beam is interrupted, this indicates a bottle in the path. Each of the sensors will be provided with time delay circuits to thereby distinguish between spaced-apart bottles passing through the path and an accumulation of bottles continuing to block the path. A predetermined time delay, such as fifteen to thirty seconds, may be used in association with the photoelectric sensors, so determining that the beam has been continually interrupted for this period of time, a positive indication of the determined backlog at each station being made.

The time delay circuits may also provide a provide relatively short time delay or react almost instantaneously after having sensed that the accumulation of containers has disappeared. The time delay circuitry includes logic which enables it to determine its mode in sensing an accumulation of containers. Thus when it senses that the accumulation has disappeared, it brings into effect the second time delay or instantaneous reaction which is different from the time delay provided by the circuits when sensing that an accumulation of containers has been achieved. The time delay circuits are, therefore, adjusted so as to distinguish between an incoming flow of spaced-apart bottles and the previous accumulation of bottles. After the sensor has been actuated by an accumulation of bottles, an incoming flow of now spaced-apart bottles causes the sensor output to de-actuate.

Figure 5:
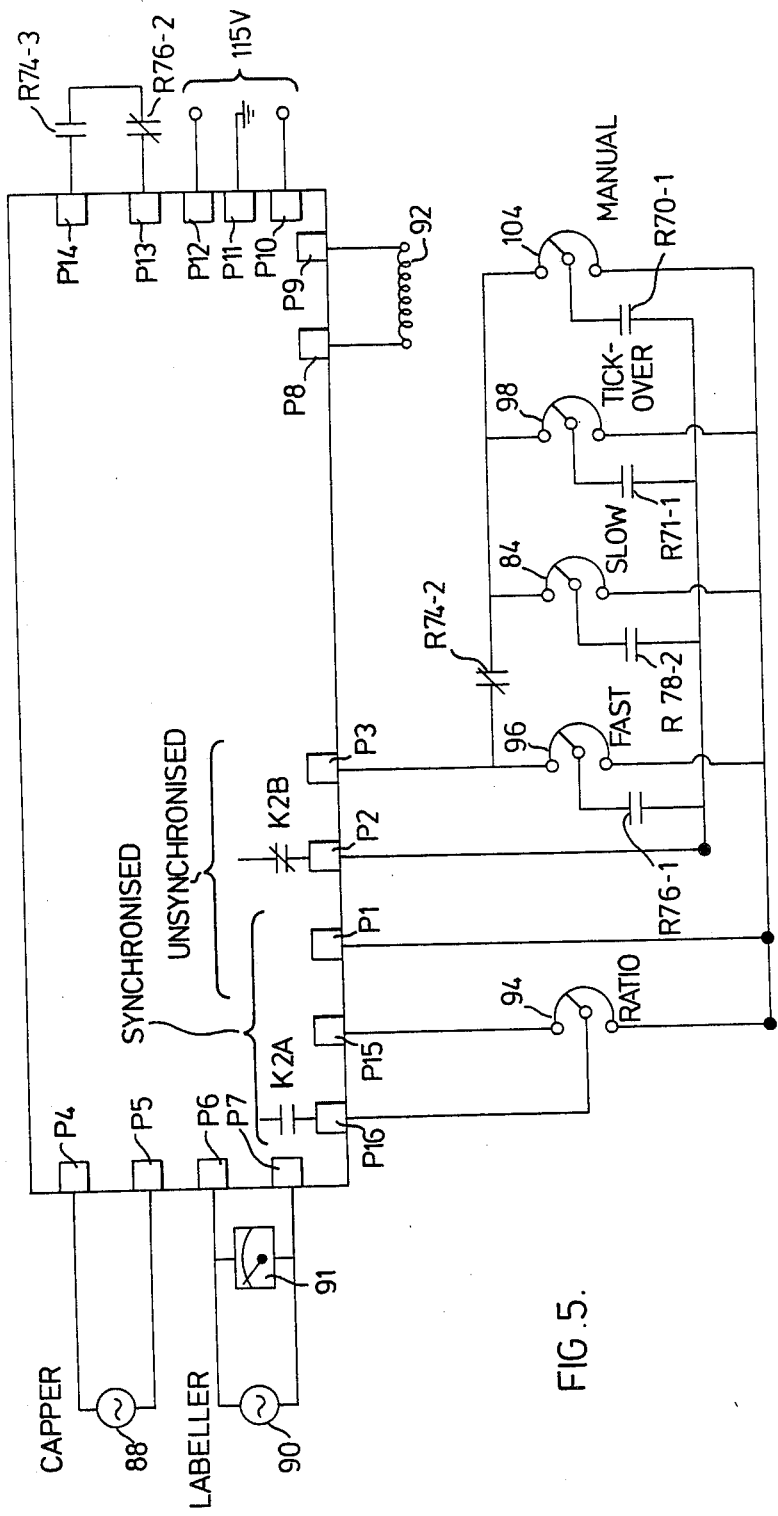
FIG. 5 is a connection diagram showing the external circuitry which provides the various inputs for several speeds to the controller in controlling the speed of the drive for the labeller.

Turning to FIGS. 3, 4 and 5, a preferred arrangement is shown for certain aspects of the circuitry, in controlling the speeds of the labeller relative to the speed of the capper and detected accumulation of containers. In FIG. 3, the sensor units 32, 34, 38, 42 and 48 are shown with respective logic in responding to actuation or de-actuation of one or more of the sensors. It is appreciated, of course, that other types of sensors than the photoelectric units may be used. However, for sake of explanation, it is appreciated that, with sensors 32, 34, 38, and 42, they become activated when bottles have accumulated sufficiently to block the light path and thus the dark spots indicate a state of energization. With sensor 48, it is such that it is energized when bottles are not blocking its path. Of course, the state of energization or actuation and de-actuation is in accordance with the time delay circuits, so that spaced-apart bottles breaking the beam only have the appropriate effect of indicating that there is no accumulation at a particular sensor. In conjunction with the sensors in the logic arrangement, there are relay contacts R48-1, R72-1 and R74-1, the purpose of which will be later explained.

Commencing startup of the container processing line, containers begin to build on the conveyor in area 54 and will eventually cause an actuation of sensor 32. Considering circuitry of FIGS. 3 and 4 with the switch 82 in the auto setting, relay coil 72 is energized. Thus, relay contact R72-1 is closed and photoelectric unit 48 is energized thus closing contact R48-1. Actuation of sensor 32 causes closure of contact R32-2. R34-2 is normally closed in the line including relay coil 78, thereby energizing relay coil 78. In this mode with reference to FIG. 5, since contact R74-2 is closed and with relay coil 78 being actuated, contact R78-2 is closed thereby connecting the wiper of rheostat 84 onto the pin P2 of the speed controller 86. Depending upon the setting on rheostat 84, the appropriate signal is applied to pin P2 which, in being input to the controller 86, adjusts the speed of the labeller.

There is a voltage signal from a tacho-generator 90 mounted on the labeller drive shaft which is input to the controller at pins P6 and P7. This provides a feedback to the controller 86 in its controlling and adjusting the speed of the labeller according to the input from rheostat 84. The controller 86 is powered by 115 V source at pins P10, P11 and P12. In accordance with the input from rheostat 84, the controller applies a portion of the power supply as an output current in a clutch coil generally designated 92 at pins P8 and P9. The clutch coil may be a component of an electromagnetic clutch which interconnects a power drive to the labeller drive. The amount of current in the clutch coil 92, as determined by the controller, sets the speed at which the labeller runs. With the feedback from tacho-generator 90, the amount of current in clutch coil 92 will be varied so that the speed of the labeller is maintained in accordance with the input signal from rheostat 84. In other words, the controller compares the voltage from rheostat 84 with a portion of the voltage from the tacho-generator and the difference is amplified in the controller to provide excitation current to the clutch coil in order to minimize the difference in rheostat and tacho-generator voltages.

It is appreciated that other forms of drive speed control may be used. For example, the controller may be adapted to control variable speed drive sources such as DC motor, variable frequency AC motor and electronically controlled hydraulic and pneumatic speed variable systems.

With reference to the container stop 28, on startup, as shown in FIG. 4, with switch 100 in the auto setting, activation of relay coil 78 closes contact R78-3. This energizes solenoid 102 of the gate control 28 to withdraw the arm 52 from the conveyor.

The next phase in the sequence, assuming the packing unit is operating at the correct speed, is that a backlog of containers establishes in area 36, because the slower speed as set by the rheostat 84 is less than the speed at which the capper is operating. When sensor 34 is actuated according to FIG. 3, and since contacts R48-1 and R78-1 are closed, this closes contact R34-1 and opens contact R34-2. The slow speed relay coil 78 is de-energized due to the opening of R34-2. Contact C1 is closed due to the operation of the capper; R42-1 is normally closed; R32-1 is closed because sensor 32 is actuated; R34-1 is closed; and R78-1 is normally closed, because the downstream sensor 40 at this time is presumed to be open and thus energized, thereby energizing relay coil 74. This closes contact R74-4 to maintain the arm 52 of the gate withdrawn as contact R78-3 opens due to the de-energization of coil 78.

With the energization of relay coil 74 referring to FIG. 5, contact R74-2 opens thus removing the control voltage from rheostats 84, 98 and 104. Simultaneously, contact R74-3, between pins P13 and P14, is closed which has for its purpose to close contact K2A and open normally closed contact K2B which is internally of the controller. Thus, the controller 86 is placed in the synchronized mode with control input for the speed adjustment at pins P1, P15 and P16. The controller 86 includes input at pins P4 and P5 from a tacho-generator generally designated 88 which is connected to the capper 12. The tacho-generator signal on pins P4 and P5 is representative of the sensed capping speed of that machine. In the synchronized mode of operation, the input from the tacho-generator 88 representative of the capper speed is analyzed by the controller 86 and in accordance with the input from tacho-generator 90 for the labeller speed, it is attempted by controller 86 to match the speeds by varying the current to clutch coil 92. To assist in the operation of the labeller, a visual readout of labeller in terms of bottles per minute is displayed on meter 91.

Rheostat 94 adjusts the ratio with regard to the signal from tacho-generator 88 to provide adjustment to tune the controller in synchronizing the speeds of the capper and the labeller. Thus in the synchronized mode, controller 86 can be programmed by rheostat 94 and, in accordance with input from tacho-generator 88, to apply a current to clutch coil 92 to adjust the speed of the labeller to that of the speed of the capper. Feedback by tacho-generator 90 serves to continually monitor the speed of the labeller. Thus, the controller 86 is set up to continuously monitor the speed of the capper and upon detecting a variation in the speed of the capper, it correspondingly changes the speed of the labeller. With this arrangement, the predetermined backlog in area 36 on the conveyor system will be maintained. To facilitate the operation of sensor 34 in signalling the predetermined backlog and avoiding false alarms in synchronizing the labeller with the capper speed, the time delay for sensor 34 may be such that before the speed of the labeller is synchronized with the capper, some additional bottles are permitted to accumulate upstream of the sensor 34. This ensure that, once the speed of the labeller is synchronized with the capper, there is always a slight excess of accumulation of bottles upstream of the sensor 34 to thereby maintain the labeller in the synchronized speed mode. Should there be from time to time a slight variation in the manner in which the containers accumulate in the area of sensor 34, the slight additional, accumulation upstream of sensor 34 avoids de-actuating of the sensor 34 due to the bottles not accumulating in an even manner in area 36.

The next aspect of the sequence would be, for example, if packer or labeller were to stop causing an accumulation of containers in area 40. Once the accumulation reaches a point where sensor 38 is actuated and the labeller is running and since switch 82 is in the auto position, contacts R74-1, R48-1 and R72-1 are closed. In this situation contact R38-1 of FIG. 4 is closed and R78-1 is normally closed, thus energizing coil 76. With reference to FIG. 5, R76-2 opens at pin P13 thus opening contact K2A and returning K2B to its normally closed position. In addition, contact R76-1 is closed thus input from rheostat 96 is applied to pin P2. With the controller returned to its unsynchronized mode, depending upon the setting for rheostat 96, the speed of the labeller may be increased to a speed greater than the capper speed. An appropriate current determined by the controller is fed to clutch coil 92 to increase the speed as monitored by tacho-generator 90 to the desired faster speed to clear the backlog in area 40.

To achieve the objective of clearing the backlog in area 40 as quickly as possible to thereby accommodate containers again in the large accumulation area should the labeller or packer stop or slowdown, the labeller continues to run at its preset fast speed which is faster than the capper speed. This is accomplished in the circuitry by the following means. As soon as the faster speed has cleared containers away from the sensor 38, it will de-energize instantaneously or after the short time delay and open contact R38-1. However, coil 76 remains energized because it has locked itself on by R76-3. Therefore, the labeller continues to run at the faster speed until the containers are cleared from sensor 34, at which time R34-1 opens either instantaneously or after its short time delay to de-energize coils 74 and 76. At this moment the labeller is dropped to its slow speed to permit bottles to accumulate and block sensor 34, and after the time delay, the labeller is resynchronized with the speed of the capper to maintain the desired backlog in area 36. As a result, the line is in readiness to accommodate another large backlog in area 40 should the need arise.

The next aspect to consider in the operation of the circuitry, is the situation where a backlog begins to develop downstream of the labeller which may be caused by a slowdown in the packing unit. When sensor 42 is actuated to indicate a backlog in the area 44, with reference to FIG. 3, contacts R48-1 and R72-1 are closed with the switch 82 in the auto setting. This closes contact R42-2 and opens normally closed contact R42-1. Thus, coil 78 is energized along with de-energization of either or both of coils 74 and 76. This provides input to the controller 86 in the unsynchronized mode from slow speed rheostat 84. Thus, the labeller speed, as controlled by current fed to clutch coil 92, is reduced to its slow speed.

In the event that the backlog continues to build and area 46 is filled, as sensed by sensor 48, contact R48-1 is opened to cancel input from sensors 32, 34, 38 and 42 and R48-2 returns to its normally closed state to energize coil 71. With regard to the circuitry of FIG. 5, coil 71 closes contact R71-1 whereby rheostat 98 is input to the controller 86 via pin P2 and is set so as to run the labeller at a "tick over" speed. This clears the bottles out of the machine at a speed of perhaps 50 or 60 bottles per minute to ensure that no freshly glued labels remain on the labelling pads. Simultaneously with this action, the arm 52 of stop 28 is extended across the conveyor. This is a result of contact R48-1 opening to de-energize coils 74 and 78 and opening R74-4 and R78-3. Solenoid 102 is then de-energized thus permitting the arm 52 to extend across conveyor and stop further flow of bottles into the labeller.

The machine may also be operated in the manual mode by moving switch 82 to the manual position and switch 100 to the manual position. With switch 82 in the manual position, this actuates coil 70 to close contact R70-1 shown in FIG. 5, thus the setting on rheostat 104 controls the speed at which the labeller operates and which may be manually varied. In addition, moving switch 100 to the manual position withdraws the arm 52 by energizing solenoid 102 to permit a flow of bottles into the labeller.

The speed controller, which may be instead a programmable microprocessor, provides an overall control in the flow of bottles in the container processing line. The synchronization of the speed of the labeller with that of the capper provides and maintains the desired backlog of containers upstream of the labeller. This serves an important advantage over the prior art systems by establishing the predetermined backlog to provide enough bottles upstream of the labeller to keep it operating for an extended period, should the capper shutdown. This would open contact C1 of FIG. 4, immediately causing the labeller to operate at slow speed. The labeller may continue to operate in the slow mode and continue to feed bottles to the packer while the problem with the capper is corrected. Depending upon the speed at which the labeller is operated, an appropriate backlog of containers upstream of the labeller may be chosen. For example, if the capper is normally running at 200 bottles per minute, it may be desirable to provide a 600 bottle backlog upstream of the labeller to give approximately three to four minutes of downtime for the capper while running the labeller at a slower speed of 150 to 175 bottles per minute. The line downstream of the capper may continue to run as it draws on the accumulation upstream of the labeller. In addition by maintaining or returning as quickly as possible from a backlog in area 40 to the predetermined backlog of 20 containers, this permits the use of accumulation tables which may be up to 50% smaller than other systems. The smaller accumulation system substantially reduces the cost of the overall system.

In running the labeller in a mode sympathetic to the changes in speed of the capper, one is assured of a more coordinated flow of bottles throughout the system and thus a reduction in the chances of breaking bottles.

Although various embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows;

1. A speed control system for use with a container processing line having a station for capping filled containers, and a station for labelling capped containers, a continuously moving conveyor system for conveying containers from said capping station to said labelling station, said conveyor system having provision when in use for accumulating containers upstream of said labelling station, said speed control system comprising means positioned upstream of said labelling station for sensing a predetermined accumulated backlog of containers; means for detecting the container capping speed of said capping station and means for controlling the labelling speed of said labelling station, said labelling speed control means being capable of operating said labelling station at a speed less than the container capping speed of said capping station to accumulate containers upstream of said labelling station and said speed control means synchronizing the container labelling speed of said labelling station with the detected container capping speed in response to said sensing means sensing a predetermined accumulated backlog of containers on said conveyor upstream of said labelling station.

2. A speed control system of claim 1, wherein a second sensing means is located along said conveyor downstream of said first sensing means for sensing a predetermined accumulation of conveyed containers upstream of said labelling station, said speed control means operating said labelling station at said speed slower than said capper speed in response to said second sensor sensing a predetermined minimum accumulation of containers.

3. A speed control system of claim 2, wherein a third means is located along said conveyor upstream of said first sensing means for sensing a predetermined accumulation of containers substantially greater than said first sensing means senses, said speed control means operating said labelling station at a speed greater than said capper speed in response to said third sensor means sensing a predetermined accumulation of containers greater than said first sensing means senses.

4. A speed control system of claim 3, wherein a fourth means is located along said conveyor downstream of said labelling station for sensing a predetermined minimum accumulation of containers downstream of said labelling station, said speed control means operating said labelling station at said slower speed in response to said fourth sensor means sensing the minimum accumulation of containers downstream of said labelling station, the signal from said fourth sensor means overriding a signal from either of said first or third sensor means.

5. A speed control system of claim 4, wherein a fifth means is located along said conveyor upstream of said fourth sensing means for sensing a maximum accumulation of containers downstream of said labelling station, said speed control actuating a means to stop flow of containers into said labelling station and operating said labelling station at a minimum speed to clear out remaining containers in response to said fifth sensor sensing the maximum accumulation of containers downstream of said labelling station, the signal from said fifth sensor means overriding all the remaining sensor means.

6. A speed control system of claim 1, 3 or 5, wherein said conveyor comprises a continuously moving surface made of a material which slips beneath the containers when the containers meet with an obstacle.

7. A speed control system of claim 5, wherein said labelling station has said stop means located immediately upstream thereof and operated by said control means to stop flow of containers into said labelling station upon actuation of said fifth sensor means.

8. A speed control system of claim 2, wherein said labelling station has a means for stopping flow of containers into said labelling station to cause an accumulation of the desired minimum number of containers, said speed control means deactuating said stop means in response to actuation of said second sensor means.

9. A speed control system of claim 5, wherein each of said sensing means is a photoelectric sensor.

10. A speed control system of claim 9, wherein time delay circuits are included with said photoelectric sensor to preclude false alarms.

11. In a bottle capping, labelling and packaging system having a device for capping filled containers, a device for labelling capped containers and a device for packaging labelled containers and a means for conveying bottles from said capping device to said labelling device and from said labelling device to said packaging device, speed control means for varying the speed of said labelling device to increase or decrease the speed at which bottles are labelled depending upon various sensed predetermined accumulated backlogs of containers upstream of said labeller, the improvement comprising means for detecting the speed at which said capping device is capping bottles, means for sensing a particular predetermined accumulation of containers upstream of said labelling device, said speed control means being adapted to synchronize the speed of said labelling device with the detected speed of said capping device in response to actuation of said sensing means.

12. In a system of claim 11, said speed control means operating said labelling device at a speed less than the speed at which said capping device is operating to accumulate a desired particular backlog of containers upstream of said labelling device.

13. In a system of claim 11, said conveyor system comprising a continuously moving surface which is adapted to slide beneath a backlog of containers as they accumulate in readiness for subsequent labelling by said labelling device.

14. In a system of claim 11, said speed control means being an electronic controller with input from said capper speed detecting means and said sensing means, said electronic controller in response to actuation of said sensing means operating said labelling device at a speed essentially the same as the detected speed of said capping device in terms of bottles per minute processed to thereby maintain the desired predetermined backlog of containers upstream of said labelling device while the speed of the capping device varies.

15. In a system of claim 14, said sensing means being a photoelectric sensor with beam traversing said conveyor, there being time delay circuits for said sensing means to preclude false alarms in sensing container accumulations.

16. In a system of claim 14, said labelling device having a drive with an electrically variable speed output means, said speed control means varying an electrical signal to said output means to correspondingly vary the output speed of said drive, means for monitoring the speed at which said labelling device labels containers with feedback from said monitoring means to said speed control means.

17. In a system of claim 11, additional means for sensing accumulation of containers upstream of and downstream of said labelling device, the sensors located immediately upstream of and downstream of said labelling device causing actuation of a container stop upstream of said labelling device when there is a deficiency of containers upstream of or a maximum accumulation of containers downstream of said labelling device.

18. In a system of claim 17, said first sensor upstream of said labeller upon sensing a minimum accumulation of containers, withdrawing said container stop, said speed controlling means operating said labelling device at a speed less than the speed of said capping device in response to actuation of said first sensing means.

* * * * *